(12) United States Patent
Nonoyama et al.

(10) Patent No.: US 7,433,067 B2
(45) Date of Patent: Oct. 7, 2008

(54) PRINTER, PRINTING SYSTEM, RECORDING MEDIUM AND SERVER REQUIRING AUTHENTICATION

(75) Inventors: Masahiro Nonoyama, Toyokawa (JP); Toshikazu Higashi, Aichi-Ken (JP); Yoshiki Nakazawa, Toyokawa (JP); Kiyohito Tsujihara, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 816 days.

(21) Appl. No.: 09/984,141

(22) Filed: Oct. 29, 2001

(65) Prior Publication Data

US 2002/0145748 A1 Oct. 10, 2002

(30) Foreign Application Priority Data

Oct. 30, 2000 (JP) ............................. 2000-330979

(51) Int. Cl.
   G06K 15/00 (2006.01)
(52) U.S. Cl. ..................................... 358/1.15; 358/1.14
(58) Field of Classification Search ................ 358/1.14, 358/1.15, 407, 1.6, 1.9; 399/80, 8, 79; 709/203
   See application file for complete search history.

(56) References Cited

U.S. PATENT DOCUMENTS

| | | | | |
|---|---|---|---|---|
| 5,956,487 A | * | 9/1999 | Venkatraman et al. | 709/218 |
| 5,970,218 A | * | 10/1999 | Mullin et al. | 358/1.15 |
| 6,160,629 A | * | 12/2000 | Tang et al. | 358/1.1 |
| 6,317,823 B1 | * | 11/2001 | Wakai et al. | 712/220 |
| 6,378,070 B1 | * | 4/2002 | Chan et al. | 713/155 |
| 6,467,087 B1 | * | 10/2002 | Yang | 717/168 |
| 6,498,912 B1 | * | 12/2002 | Leni et al. | 399/79 |
| 6,564,214 B1 | * | 5/2003 | Bhide | 707/6 |
| 6,771,386 B1 | * | 8/2004 | Kato | 358/1.15 |
| 2002/0032862 A1 | * | 3/2002 | Harrison et al. | 713/173 |
| 2003/0011809 A1 | * | 1/2003 | Suzuki et al. | 358/1.15 |
| 2003/0079132 A1 | * | 4/2003 | Bryant | 713/182 |

FOREIGN PATENT DOCUMENTS

| | | | |
|---|---|---|---|
| JP | 05-143253 | | 6/1993 |
| JP | 09-006562 | | 1/1997 |
| JP | 9-244828 | * | 9/1997 |
| JP | 10-312249 | | 11/1998 |
| JP | 11-165446 | | 6/1999 |
| JP | 11-249848 | | 9/1999 |
| JP | 11-353137 | | 12/1999 |
| JP | 2000-298561 | | 10/2000 |
| JP | 2001-350602 | * | 12/2001 |
| WO | WO 02/33530 | * | 4/2002 |

* cited by examiner

*Primary Examiner*—Jerome Grant, II
(74) *Attorney, Agent, or Firm*—Buchanan Ingersoll & Rooney PC (57) ABSTRACT

When a print job is received from the network, subsequent processing depends on whether the print job includes authentication information. Where the print job includes authentication information, the print job is stored in a memory while being associated with the authentication information. When authentication information is received from the network thereafter, a print controller selects, from among the print jobs stored in the memory, the job that is associated with authentication information that matches the received authentication information, and causes it to be printed.

21 Claims, 8 Drawing Sheets

| 200 | 201 | 202 | 203 | 204 |
|---|---|---|---|---|
| header | JOB ID code | transmission mode (JOB mode) | print control command | print data |

Fig.5

| 205 | 206 | 207 |
|---|---|---|
| header | JOB ID code | transmission mode (ID transmission mode) |

Fig.8

# PRINTER, PRINTING SYSTEM, RECORDING MEDIUM AND SERVER REQUIRING AUTHENTICATION

CROSS-REFERENCE TO RELATED APPLICATIONS

This application is based on application No. 2000-330979 filed in Japan, the contents of which is hereby incorporated by reference.

BACKGROUND OF THE INVENTION

1. Field of the Invention

The present invention relates to a printing system in which components are interconnected via a network, and more particularly, to a printing system in which a job created using a computer or other apparatus may be printed out from multiple printers, as well as to a printer used for such a system.

2. Description of the Related Art

In recent years, an increasing number of network printing systems, in which multiple host machines such as personal computers or work stations and multiple printers and copying machines are connected via a LAN, are being used in offices and schools where documents and images are processed using computers. Using such a network printing system, printing may be performed by selecting a printer that is capable of fast printing, or multiple documents may be simultaneously printed using multiple printers. Even when multiple people wish to perform printing at the same time, printing may be performed using an available printer without waiting for the previous user to finish printing. Therefore, printing may be made efficient and the printers may be used effectively.

In addition, in a network printing system, a host machine that creates the print job and a printer that outputs the print job are generally located with some distance therebetween. Therefore, ordinarily, when the print job created using the host machine is automatically printed out by the printer, any person can see the contents of the output print job. Technologies regarding a so-called confidential print mode have been proposed in which, where the user wants to avoid the situation described above, printing is initiated only when the user physically comes to the printer and inputs his ID code (authentication information).

However, in the confidential print mode in the conventional network printing system described above, when a single job is printed out from multiple printers, the user inputs his ID code in each printer to initiate printing. Consequently, the system requires labor and time on the part of the user.

OBJECTS AND SUMMARY

The present invention was created in order to resolve these problems with the conventional art. An object of the present invention therefore is to provide a printing system that, when printing using the confidential print mode is performed via multiple printers, the labor and time related to the operation to input the authentication information may be reduced, as well as a printer for such system.

According to the first aspect, a printer connected to a network, comprising a memory which, where a print job received from the network includes authentication information, stores the print job that is associated with the authentication information; and a first print controller which, when authentication information is received from the network, performs a printing operation of the print job that are associated with the received authentication information from among print jobs stored in said memory.

In the embodiment, when a print job is received from the network, subsequent processing depends on whether the print job includes authentication information. Where the print job includes authentication information, the print job is stored in the memory while being associated with the authentication information. When authentication information is received from the network thereafter, the first print controller selects, from among the print jobs stored in the memory, the job that is associated with authentication information that matches the received authentication information, and causes it to be printed.

Specifically, based on the receipt of authentication information input to another printer, which is connected to the subject printer via the network, the print jobs among the print jobs assigned to the printer that are associated with the same authentication information are printed out. Because print jobs stored in the memory are extracted and printed based on the reception of authentication information from the network in this way, the labor on the part of the user to input authentication information in each printer may be eliminated, and at the same time, the time entailed by this operation may be reduced. Where a print job that does not include authentication information is received from the network, it is immediately printed out without being stored in the memory.

In the embodiment, the printer further includes an input unit by which the user inputs authentication information, and a second print controller that, when authentication information is input from the input unit, causes to be printed, among the print jobs stored in the memory, the print jobs that are associated with authentication information that matches the input authentication information, and a transmission controller that, when authentication information is input via the input unit, transmits the input authentication information to the network.

When authentication information is input via the input unit in such a printer, the second print controller causes to be printed, from among the print jobs already stored in the memory, the print jobs that are associated with authentication information that matches the input authentication information. The transmission controller transmits the input authentication information to other printers via the network. A different printer that receives the authentication information performs printing based on the first print controller as described above. Through this operation, even when confidential printing is performed from multiple printers connected to a network, authentication information must be input to one printer only. Consequently, the labor to input authentication information may be eliminated and the time required for the operation may be reduced.

Here, it is preferred that the transmission by the transmission controller is performed only when there is a print job that, among the print jobs stored in the memory, is associated with authentication information that matches the input authentication information.

According to the second aspect, a printing system having printers which are connected to a network, comprising an input unit by which the user inputs authentication information; and a transmission controller that, when authentication information is input from the input unit, transmits the input authentication information to the network, wherein the each printer includes, a memory that, when the print job received from the network includes authentication information, stores the print job while associating it with the authentication information, and a first print controller that, when authentication information is received from the network, performs a printing operation of the print job that are associated with the received authentication information from among print jobs stored in said memory.

In this printing system, when a print job including authentication information is received by a printer from the network, that print job is stored in the memory of that printer while being associated with the authentication information. When authentication information is subsequently input by the user via an input unit within the printing system, the transmission controller transmits the authentication information to the network. When the previous printer receives this authentication information, the first print controller of that printer causes to be printed, among the print jobs stored in the memory of the printer, the print jobs that are associated with authentication information that matches the authentication information received.

Furthermore in the embodiment, it is preferred that in this printing system, at least one printer have a built-in input unit and a transmission controller, as well as a second print controller that, when authentication information is input via the printer's input unit, causes to be printed, among the print jobs stored in the memory of the printer, the print jobs that are associated with authentication information that matches the input authentication information.

As described above, the printer causes printing by another printer via the first print controller of the other printer based on the input unit and transmission controller thereof, and also executes printing via the second print controller thereof. In other words, through input of authentication information by the user via the input unit of one printer, the authentication information is also distributed to other printers connected to the network. Therefore, the labor on the part of the user to input authentication information in each printer is eliminated, and the time for operation may be reduced.

Furthermore, the embodiment further encompasses (i) a computer-readable recording medium that stores a program that is executed by a computer, the program comprising the steps of judging whether or not an input authentication information matches any authentication information already stored when authentication information is input; causing a first printer to perform a print job that is stored in the first printer and that are associated with the matching authentication information, where there is a match by the judging step; and causing a second printer to perform a print job that is stored in the second printer and that are associated with the matching authentication information, where there is a match by the judging step, as well as (ii) a server that can distribute this program.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

A specific embodiment of the present invention is explained below in detail with reference to the accompanying drawings.

Figure 1:
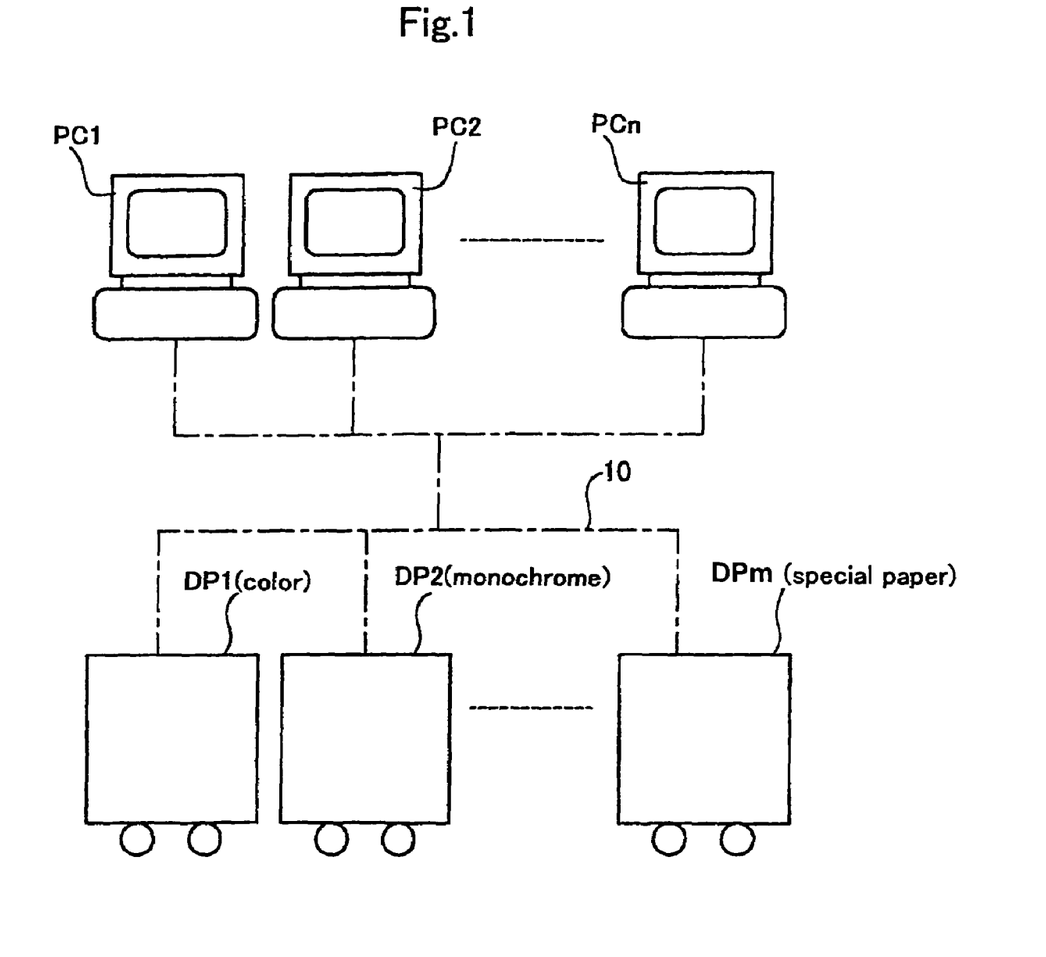
FIG. 1 is a drawing showing the overall construction of the printing system pertaining to an embodiment.

The printing system pertaining to this embodiment has the construction shown in FIG. 1. In other words, this printing system includes multiple clients PC1, PC2 . . . , PCn (n is a natural number) and printers DP1, DP2 . . . , DPm (m is a natural number), which work as image forming apparatuses. Each client PC1, PC2 . . . , PCn is a terminal such as a personal computer or workstation that is operated by the user. Furthermore, each client PC1, PC2 . . . , PCn and each printer DP1, DP2 . . . , DPm is connected with the others via the network 10.

The printers DP1, DP2 . . . , DPm have various different functions such as color printing, monochrome printing and printing using special paper, and these functions are identified on the network 10 based on a printer ID code. In other words, when a print instruction is issued to a printer by the user from his terminal, job data that includes a print control command and print data is transmitted for printing, and a printer ID code is also added to this job data. Consequently, the user can designate a printer and cause copies of a desired type to be output.

In addition, this printing system has a confidential print mode. In contrast to the regular print mode in which the printing process begins immediately after the print instruction from the user reaches the printer, when the confidential print mode is activated, printing is begun only when the user comes to the printer and inputs the job ID code in the printer. When a print instruction is issued by the user to the printer using the confidential print mode, a job ID code is added to the job data.

Figure 2:
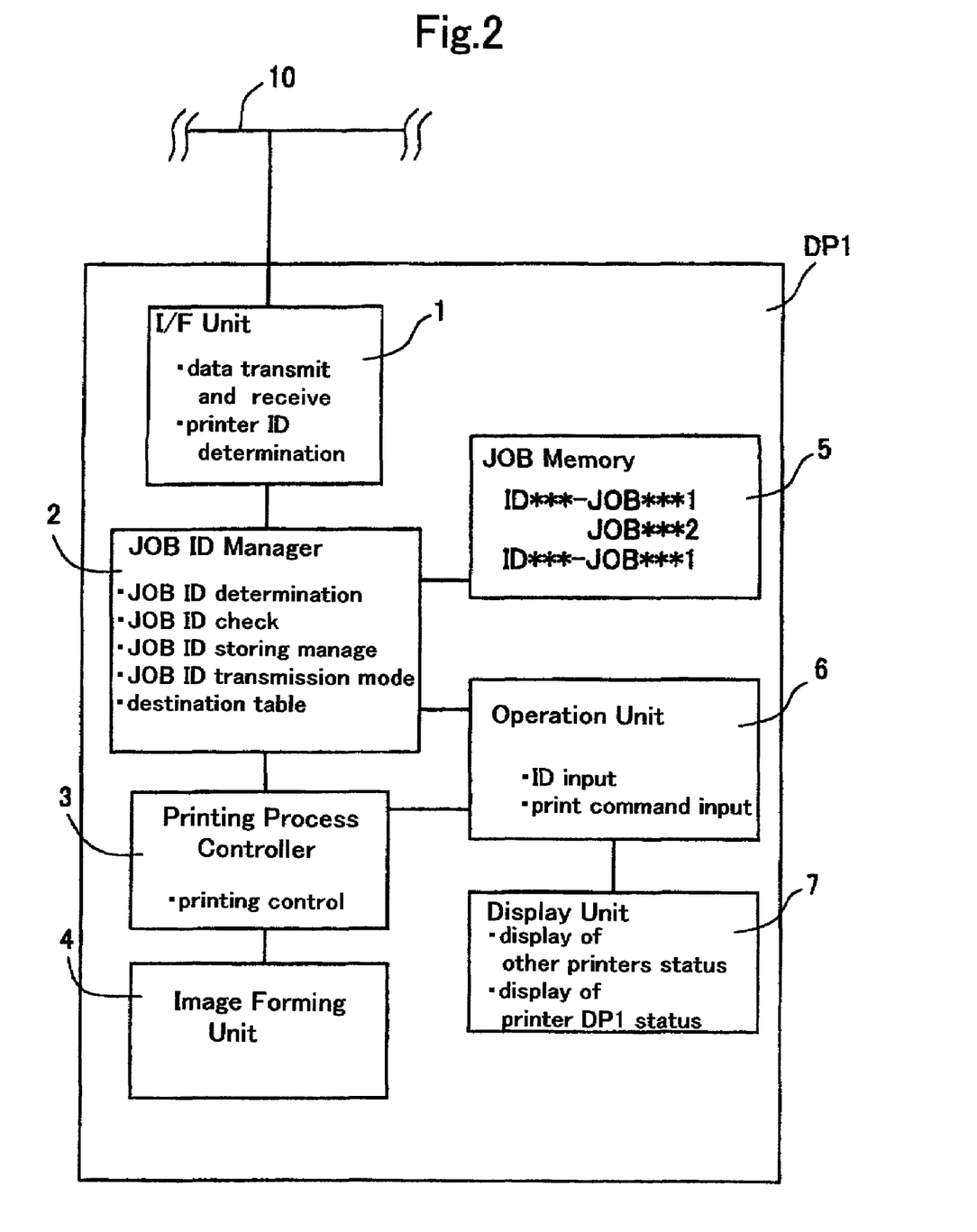
FIG. 2 is a block diagram of the printer's control system pertaining to the embodiment.

FIG. 2 is a block diagram of the control system for the printer DP1. The printer DP1 has an I/F unit 1, a job ID manager 2, a printing process controller 3, an image formation unit 4, a job memory 5, an operation unit 6 and a display unit 7.

The I/F unit 1 is a block that incorporates data from the network 10 and transmits data to the network 10. It also has a function to determine, based on the printer ID code added to the job data, whether or not the job data on the network 10 is for the printer in which it resides. Naturally, only job data that is addressed to the printer in which the I/F unit 1 resides is incorporated into the printer DP1 via the I/F unit 1.

The job ID manager 2 is a block that manages the job ID code that may be added to the job data. Specifically, it performs determination regarding whether or not a job ID code is added to the job data received from the network 10, checking to determine if the job ID code added to the job data received matches any of the job ID codes stored in the job memory 5, creation of job ID transmission mode data described below, etc. It also has a table of printer IDs for other printers which may become the destination for the job ID when the job ID transmission mode is activated. Other printers that may become the destination for the job ID are printers located near the original printer (i.e., printers located in the same room or on an adjacent desktop, for example). This table may be located outside the printers, i.e., in a print server, for example, so that it may be read in via the network 10. Alternatively, the destination for the transmission of the job ID may be selected based on the parameters of the other printers, or may be designated by the user via the operation unit 6.

The printing process controller 3 is a block that performs various types of control regarding printing. The image formation unit 4 is a block that performs actual image formation.

The job memory 5 is a block in which job data received with a job ID code, i.e., job data transmitted in the confidential mode, is temporarily stored. In this memory, the job ID code for the job data and the print contents data are saved in addresses that are associated with each other. Where multiple sets of job data with the same job ID code are received, multiple sets of print contents data may be saved while associated with a single job ID code. This is done in order to enable printing of multiple jobs when the job ID code is input once.

Figure 3:
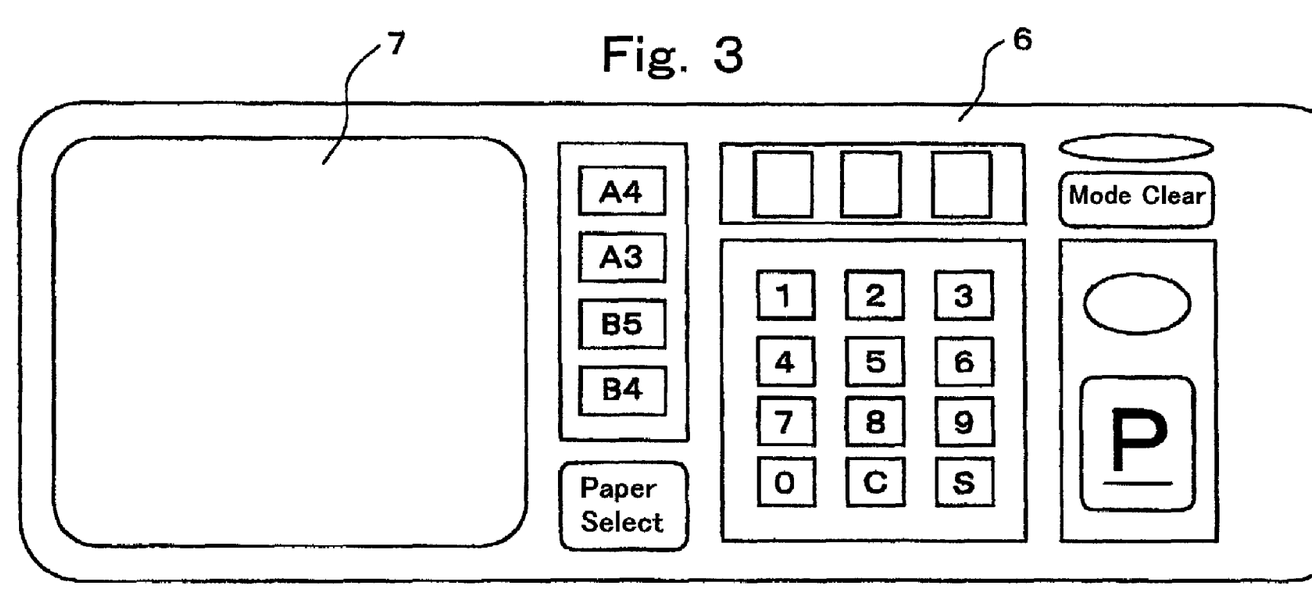
FIG. 3 is a drawing showing the operation unit and display unit of a printer.

The operation unit 6 is an operation unit for the printer, and is used by the user in order to input the job ID code when causing confidential mode jobs to be printed. It is also used for the inputting of various settings regarding printing. The display unit 7 is where the status, etc. of the printer is displayed. Specifically, the operation unit 6 and display unit 7 are constructed as operation keys and a display screen for an operation/display panel as shown in FIG. 3. While the printer DP1 was used above for the explanation of the construction thereof, the same construction is used in other printers as well.

In this printing system having the above construction, when the user executes printing, he designates a printer to use and transmits job data to the network 10. The job data includes a printer ID code that indicates the designated printer. The details regarding this code are explained below. Where job data that includes a printer ID code that designates the printer DP1, DP2 . . . or DPm exists on the network 10, the designated printer incorporates the job data. Where a job ID code is added to the job data, the printer determines that the job data was transmitted using the confidential print mode. It then stores the job data in the job memory 5. When the user inputs a job ID code via the operation unit 6, the job data stored and associated with the job ID code is read out and printing is begun.

In addition, in this printing system, a job may be distributed to multiple printers from one client and job data may be transmitted to these multiple printers. For example, a job that requires many copies may be distributed among multiple printers, or a job that includes monochrome pages and color pages may be distributed to a monochrome printer and a color printer. When such a job is transmitted using the confidential mode, the job data sets sent to the different printers have the same job ID code. In this case, print contents data sets associated with the same job ID code are stored in the job memory 5 of each designated printer. When a job ID code is input to one of these printers by the user, the printer begins confidential printing. In addition, this operation is not limited to a job that is distributed among multiple printers for printing. The same job ID code may be assigned to two or more jobs that are sent from one client.

Furthermore, the printer executes job ID transmission mode. In other words, the job ID code input by the user is forwarded to other printers. The data that forwards the job ID code will be hereinafter called job ID transmission data. The printer that receives job ID transmission data begins the applicable confidential printing as if the user had directly input the job ID code in that printer. In this way, when confidential printing is performed using multiple printers, confidential printing may be begun simultaneously on other printers simply through input of the job ID code in one printer.

Figure 4:
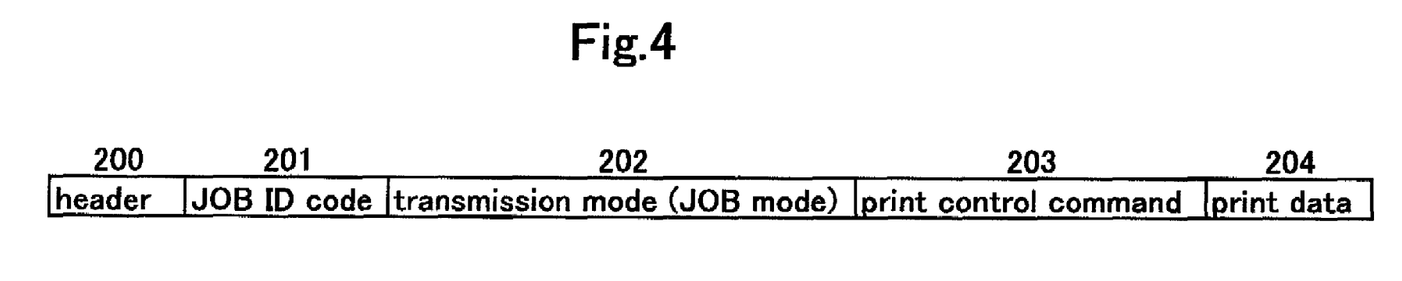
FIG. 4 is a drawing showing the construction of job data on the network.

The construction of regular job data transmitted from a client will now be explained with reference to FIG. 4. Regular job data comprises, as shown in FIG. 4, a header 200 by which the type of the data is determined, a job ID code 201, transmission mode data 202 that indicates whether the data is regular job data or job ID transmission data (because the example involves regular job data, it is set to the job mode), a print control command 203 for various types of control regarding printing and print data 204. Among these data components, the header 200 includes a printer ID code for printer identification. The job ID code 201 is added only when the user transmits the job using the confidential mode.

Figure 5:
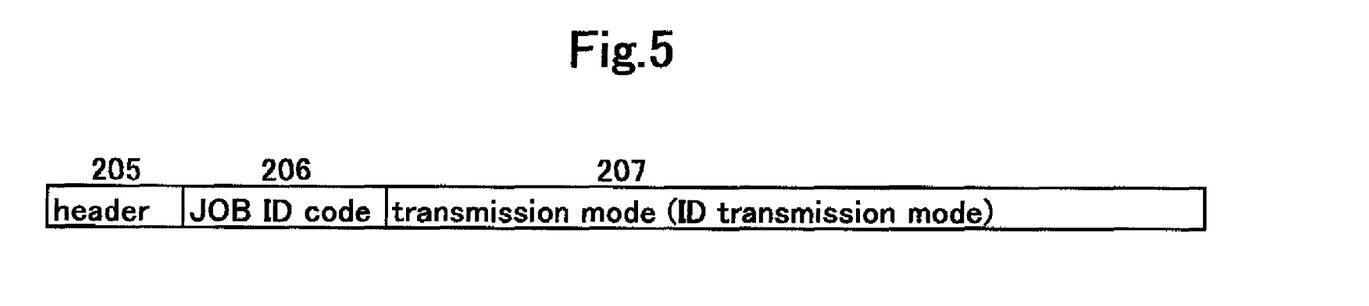
FIG. 5 is a drawing showing the construction of job ID transmission data on the network.

The construction of job ID transmission data transmitted from one printer to another printer using the confidential print mode will now be explained with reference to FIG. 5. Job ID transmission data comprises, as shown in FIG. 5, a header 205, the input job ID code 206, and transmission mode data 207 that is set to the ID transmission mode. The header 205 includes, as in the case of the header 200 in FIG. 4, a printer ID code for printer identification. The job ID code 206 is added without exception. This data is created by the printer and transmitted to the network 10 when a job ID code is input to the printer by the user. Consequently, the printer receiving the job ID transmission data may be caused to begin printing of the applicable confidential jobs as if the user had directly input r the job ID code in that printer.

There is a case in which all confidential jobs that have the same job ID code are not to be simultaneously output, but only simultaneous printing of a job that is distributed among multiple printers is desired. In such a case, the job code, which is added to the job transmitted from the client in advance, is added to the transmission mode data 207. Consequently, only the job that has the job code is simultaneously output.

Figure 6:
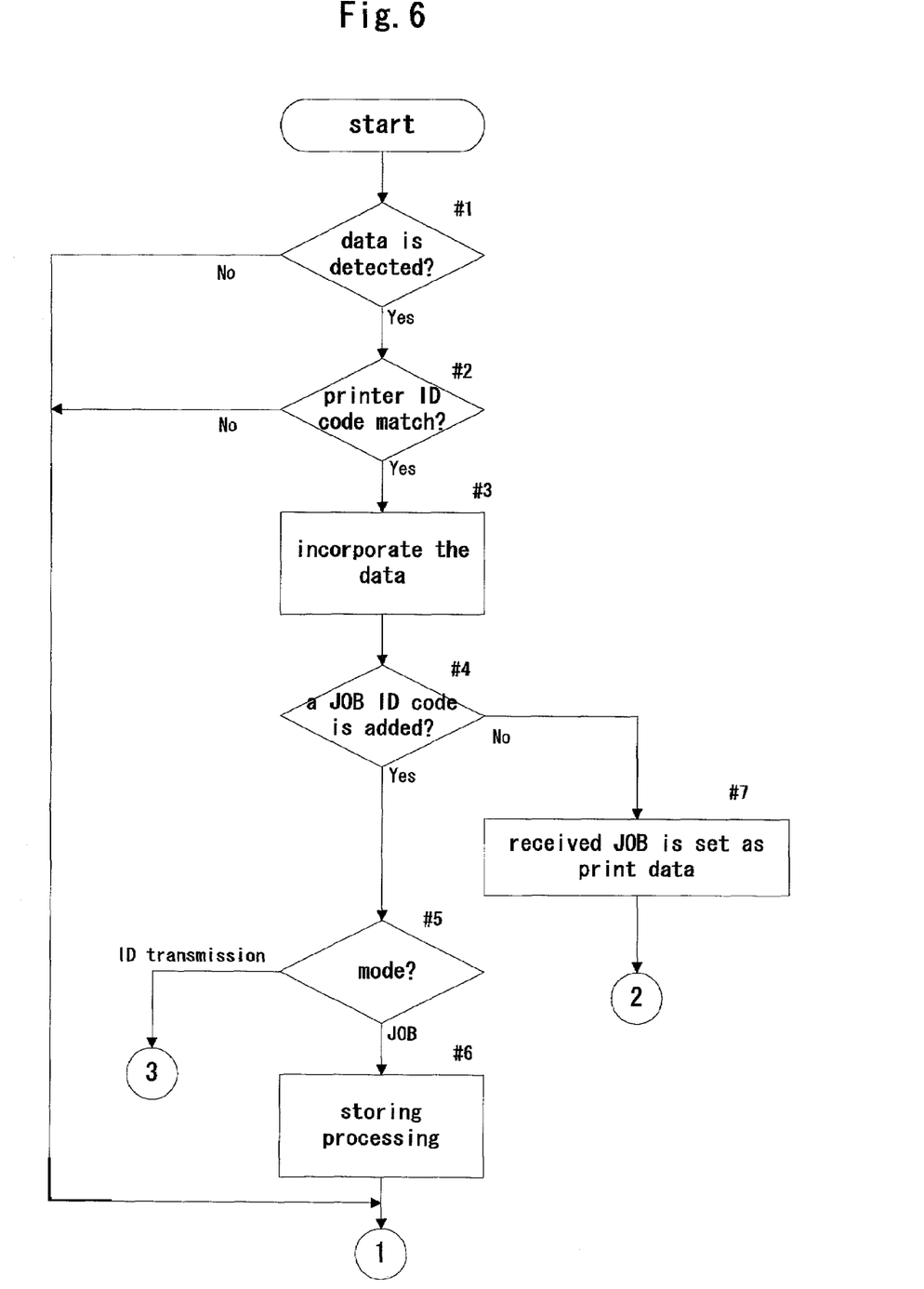
FIG. 6 is a control flow chart regarding print processing (No. 1)
Figure 7:
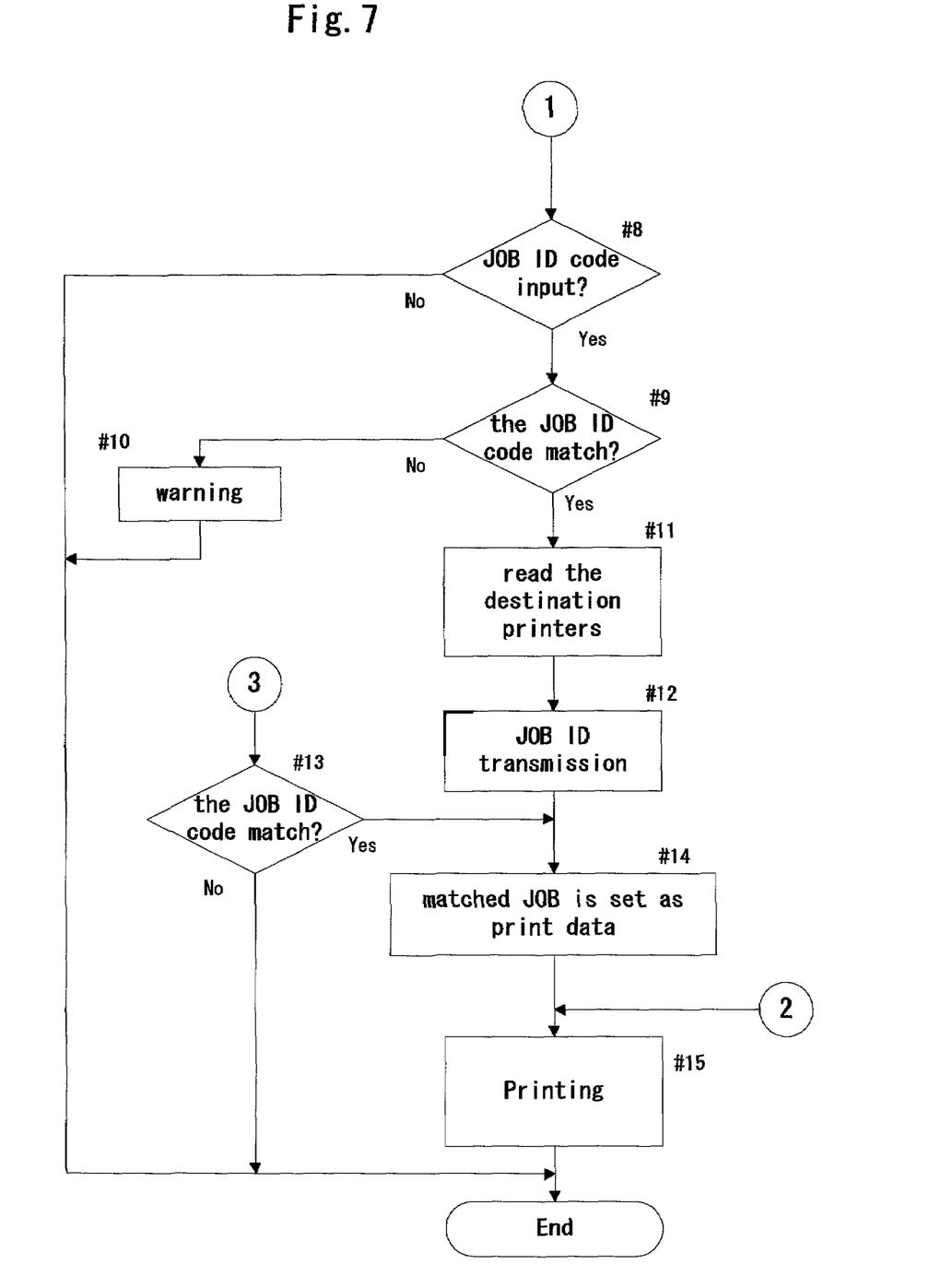
FIG. 7 is a control flow chart regarding print processing (No. 2)
Figure 8:
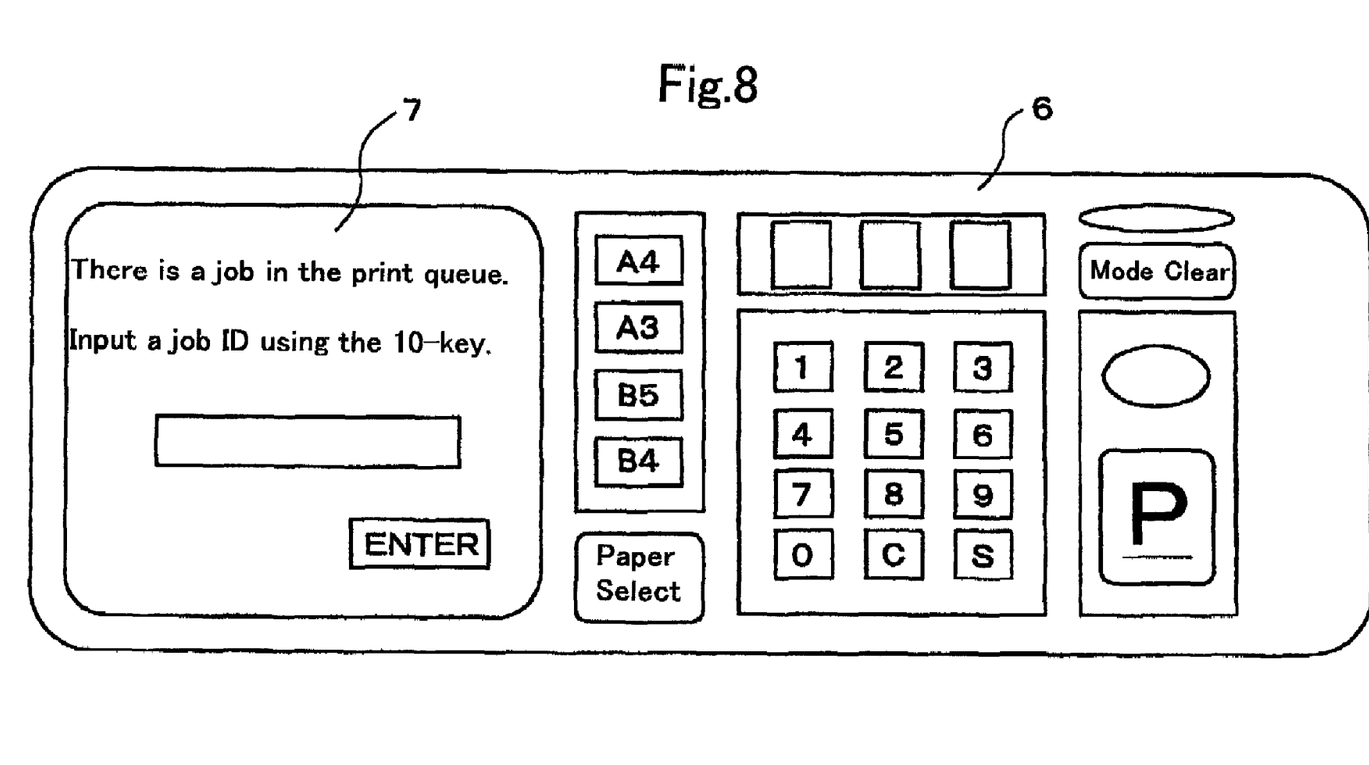
FIG. 8 is a drawing showing the operation unit and display unit of a printer.

The printing control in each printer of this embodiment will now be explained based on the flow charts of FIGS. 6 and 7. It is first determined whether or not data is output on the network 10 (#1). Where some data is detected (#1: Yes), the printer ID code included in the header (200 or 205) of the data is checked. It is then determined whether or not the printer ID code matches the printer ID code of the subject printer (#2). Where they match (#2: Yes), the data is addressed to the subject printer. The printer therefore incorporates the data (#3). Where no data is detected on the network 10 in #1 (#1: No), or where the printer ID codes do not match in #2 (#2: No), the printer advances to #8 described below without incorporating the data.

Where the data is incorporated in #3, it is then determined whether or not a job ID code (201 or 206) is added to the data (#4). Where no job ID code is added (#4: No), the data is regular job data transmitted from one of the clients and is not set to the confidential mode. Therefore, regular printing is performed for that job data. In other words, the job data is set as print data (#7), and the print data is sent to the printing process controller 3 and image formation unit 4, whereby printing is executed (#15). Namely, printing is performed immediately without waiting for the user to input a job ID code. The processing then comes to an end.

Where a job ID code is determined to be included in the data in #4 (#4: Yes), the transmission mode data (202 or 207) included in the data is checked (#5). This is done in order to determine if the data is regular job data or job ID transmission data.

Where the data is regular job data (#5: JOB), the job data is not immediately printed out, but processing takes place such that it is temporarily stored (#6), because the job data is a confidential mode job that has a job ID code based on #4: Yes. Specifically, the job ID code 201 of the job data is extracted and stored in the job memory 5. Furthermore, the print control command 203 and print data 204 regarding that job data are stored in the address blocks that are associated with the job ID code. The job data stored in this way waits for the input of the job ID code by the user via the operation unit 6 of a printer before it is allowed to be printed out. During this wait, the display unit 7 displays a message indicating that there is a job in the queue ("There is a job in the print queue. Input a job ID using the numerical keypad."), as well as a field and 'enter' button by which to input a job ID code.

It is then determined whether or not a job ID code has been input via the operation unit 6 (#8). Where no job ID code has been input (#8: No), the process ends without any further processing. Where a job ID code has been input (#8: Yes), it is determined whether or not any of the job ID codes stored in the job memory 5 matches the input job ID code (#9). Where there is no match (#9: No), a warning message is displayed in the display unit 7 (#10), and the process ends. In this case, the job is put on hold until the correct job ID code is subsequently input via the operation unit 6 of a printer.

Where a job ID code that matches the job ID code input via the operation unit 6 is found in the job memory 5 (#9: Yes), confidential printing is executed. Here, before printing is performed, the job ID code is transmitted to other printers. To that end, the printer ID codes of the destination printers are read from the printer ID table of the job ID manager 2 (#11). Job ID transmission data is then created in accordance with the data format described above with reference to FIG. 5. When this is done, one of the printer ID codes read from the printer ID table is included in the header 205. The job ID code input via the operation unit 6 is added as the job ID code 206. Naturally, the transmission mode data 207 is set to the ID transmission mode. Where multiple printer ID codes are read from the printer ID table, the number of job ID transmission data sets that equals the number of printer ID codes read are created. Where only a job distributed among multiple printers for printing is to be output simultaneously, the job code for that job is also included in the data. The job ID transmission data thus created is output to the network 10 (#12). Consequently, the job ID code is also forwarded to other printers.

Figure 9:
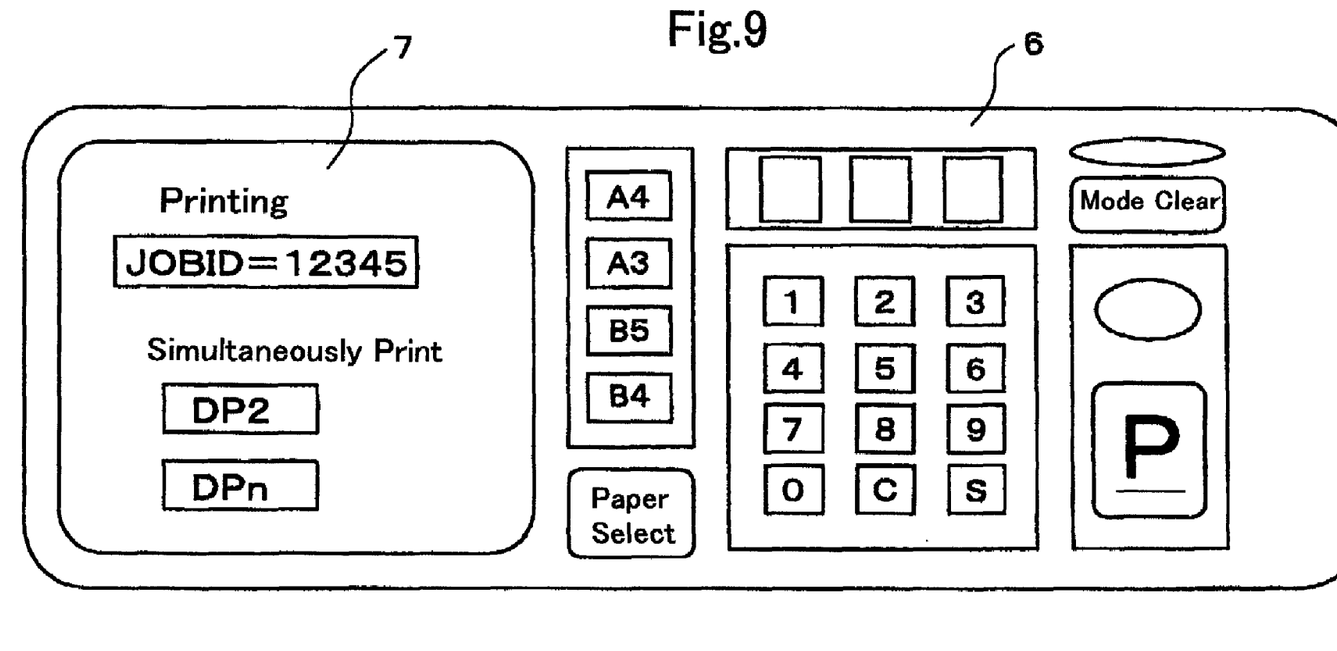
FIG. 9 is a drawing showing the operation unit and display unit of a printer.

Confidential printing is then executed. In other words, the job stored in the job memory 5 and associated with the input job ID code is set as print data (#14), and the print data is sent to the printing process controller 3 and image formation unit 4 for printing (#15). During printing, a message indicating that printing is underway ("Printing") and the job ID code for the subject job are displayed in the display unit 7 as shown in FIG. 9. Where printing is being simultaneously performed by other printers based on the input of the job ID code, the numbers of such printers are also displayed. When the printing is completed, the job ID code and print data are deleted from the job memory 5, and the process comes to an end.

Where the received data is job ID transmission data in #5 (#5: ID transmission), it is determined whether or not any of the job ID codes stored in the job memory 5 matches the job ID code 206 of the received job ID transmission data (#13). Where there is no match (#13: No), the process ends without any further processing. Where there is a match (#13: Yes), confidential printing is executed in #14 and #15 as described above. Where only a job distributed among multiple printers for printing is to be simultaneously output, it is also determined in #13 whether there is a job code match. Printing is executed in #14 and #15 only when a job ID code match and a job code match exists.

As explained in detail above, in each printer of this embodiment, where the job data received from the network 10 is a confidential job that includes a job ID code, the job is stored in the job memory 5 while it is associated with the job ID code (#6). Subsequently, where the job ID code is input via the operation unit 6 of that printer (#9: Yes) and also where the job ID code is input via the operation unit 6 of another printer that has a job associated with the same job ID code, printing of the job associated with the job ID code is executed (#14, #15).

Therefore, the printer to which a job ID code is input via the operation unit 6 not only prints out the jobs associated with the job ID code, but also transmits job ID transmission data through which the input job ID code is forwarded to other printers (#12). Other printers that receive this job ID transmission data simultaneously output applicable confidential jobs associated with the job ID code. Consequently, a printer and printing system are realized in which the labor on the part of the user to directly input a job ID code in each printer is eliminated and the operation time is reduced. Because it is inconvenient if printing is simultaneously performed by printers that are far away from the printer in which the user has input a job ID code, job ID transmission data is sent only to nearby printers that are identified in the table in advance. Consequently, the purpose of confidential mode is realized for simultaneous printing as well. Such a printer and printing system may be realized by providing the program to execute the processes described above stored in a recording medium or by distributing it from a server such that it is installed in existing printers and similar apparatuses.

The embodiment is simply an example, and does not limit the present invention in any manner. Therefore, the present invention may naturally be improved and modified in various ways within its essential scope. For example, in this embodiment, an operation unit 6 is included in each printer within the system, and a job ID code may be input by the user to any of the printers. However, the present invention is not limited to this implementation, and a system in which only a limited number of printers has an operation unit 6, or a system in which an operation unit 6 is included as an independent device outside the printers, is also possible. In addition, in this embodiment, the destination for the job ID transmission data that is sent from the printer in which a job ID code is input is set in advance. However, the destination may be selected by the user that inputs the job ID code.

As is clear from the above explanation, according to this embodiment, a printing system and a printer for that system are provided in which, where printing using the confidential print mode is performed by multiple printers, excessive labor and time are not required for the operation related to the input of ID information.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A printer connected to a network, comprising:
   a memory receives from the network a print job including authentication information, and stores the print job that is associated with the authentication information; and
   a first print controller which, when authentication information is received from the network, performs a printing operation of the print jobs that are associated with the received authentication information from among print jobs that are stored in said memory before the authentication information is received.

2. A printer as claimed in claim 1,
wherein received authentication information is transmitted from another printer which is connected to the network.

3. A printer as claimed in claim 1, further comprising:
an input unit which inputs authentication information by users operation,
a second print controller which, when authentication information is input by the input unit, performs a printing operation of the print job that are associated with the input authentication information from among print jobs stored in said memory.

4. A printer as claimed in claim 3, further comprising:
a transmission controller which transmits the input authentication information to another printer via the network when authentication information is input by the input unit.

5. A printer as claimed in claim 4,
wherein the transmission by said transmission controller is performed only when there is a print job that, among the print jobs stored in the memory, is associated with the input authentication information.

6. A printing system having printers which are connected to a network, comprising:
an input unit by which the user inputs authentication information; and
a transmission controller that, when authentication information is input to the input unit, transmits the input authentication information to the network,
wherein each printer includes,
a memory received from the network the print job includes the authentication information, and stores the print job while associating it with the authentication information, and
a first print controller that, when authentication information is received from the network, performs a printing operation of the print jobs that are associated with the authentication information received from among print jobs that are stored in said memory before the authentication information is received.

7. A printing system as claimed in claim 6,
wherein at least one printer of said printers includes said input unit, said transmission controller, and a second controller,
wherein the second controller that, when authentication information is input via the printer's input unit, causes to be printed, among the print jobs stored in the memory of the printer, the print job that is associated with the input authentication information.

8. A computer-readable recording medium that stores a program that is executed by a computer, the program comprising the steps of:
judging whether or not network input authentication information matches any authentication information already stored with a print job in a first printer when the authentication information is input;
causing the first printer to perform the print job that is stored in the first printer and that is associated with the matching authentication information, where there is a match by the judging step; and causing the first printer to transmit the authentication information to a second printer; and
causing the second printer to perform print jobs that are stored in the second printer and that are associated with the matching authentication information, where there is a match by the judging step.

9. A server that stores a program for distribution, the program comprising the steps of:
judging whether or not network input authentication information matches any authentication information already stored with a print job in a first printer when authentication information is input;
causing the first printer to perform the print job that is stored in the first printer and that is associated with the matching authentication information, where there is a match by the judging step and causing the first printer to transmit the authentication information to a second printer; and
causing the second printer to perform print jobs that are stored in the second printer and that are associated with the matching authentication information, where there is a match by the judging step.

10. A printer connected to a network, comprising:
a memory stores a print job, the print job includes an authentication information;
an input unit which a user inputs authentication information; and
a transmission controller unit, when authentication information is input to the input unit, transmits the authentication information to another printer connected to the network.

11. A printer as claimed in claim 10, further comprising:
said transmission controller includes a memory which stores printer IDs that indicate other printers; and
said transmission controller transmits the authentication information to the other printer selected based on the printer IDs.

12. A printer as claimed in claim 10, further comprising:
said transmission controller transmits the authentication information to the another printer selected based on parameters of other printers, or designated by the user via said input unit.

13. A printer as claimed in claim 10, further comprising:
said authentication information is associated with a print job that is stored in a memory of the another printer before the authentication information is input.

14. A printer connected to a network, comprising:
a memory stores a print job, the print job includes an authentication information;
a first controller that determines whether network input authentication information matches any authentication information already stored when authentication information is input; and
a second controller that performs a printing operation of the print job stored in the memory and associated with the authentication information as print data.

15. A printer connected to a network, comprising:
a memory stores a print job, the print job includes an authentication information;
a first controller that determines whether a printer ID for printer identification included in a data on the network matches the printer ID of the printer, and receives the data when there is a match; and
a second controller that performs a printing operation of the print job stored in the memory and associated with the authentication information included in the received data as print data.

16. A printer connected to a network, comprising:
a first controller that determines a printer ID for printer identification included in a data on the network matches the printer ID of the printer; and a second controller that receives the data when a match is determined.

17. A printing system having printers which are connected to a network, comprising:
an input unit by which the user inputs authentication information; and
a transmission controller that, when authentication information is input to the input unit, transmits the input authentication information to the network,
wherein each printer includes,
a memory stores a print job, the print job includes an authentication information;
a determining controller determines whether the authentication information on the network is addressed to the printer; and
a print controller that, when the authentication information on the network is addressed to the printer, performs a printing operation of the print job stored in the memory and associated with the authentication information as print data.

18. A method of connecting a printer to a network, comprising the steps of:
storing a print job which includes an authentication information;
inputting authentication information to an input unit by a user; and
when authentication information is input to the input unit, transmitting the authentication information to another printer connected to the network.

19. A method of connecting a printer to a network, comprising the steps of:
storing a print job which includes an authentication information;
determining whether network input authentication information matches any authentication information already stored when authentication information is input; and
performs a printing operation of the print job stored in the memory and associated with the authentication information as print data.

20. A method of connecting a printer to a network, comprising the steps of:
storing a print job which includes an authentication information;
determining whether a printer ID for printer identification included in a data on the network matches the printer ID of the printer, and receiving the data from the network when there is a match; and
performing a printing operation of the print job stored in the memory and associated with the authentication information included in the received data as print data.

21. A method of connecting a printer to a network, comprising the steps of:
determining if a printer ID for printer identification included in a data on the network matches the printer ID of the printer; and
receiving the data when a match is determined.

* * * * *